(12) United States Patent
Kobayashi et al.

(10) Patent No.: US 6,230,675 B1
(45) Date of Patent: May 15, 2001

(54) INTAKE VALVE LIFT CONTROL SYSTEM

(75) Inventors: Toshiki Kobayashi; Koichi Yoshiki, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/494,917

(22) Filed: Jan. 31, 2000

(30) Foreign Application Priority Data

May 19, 1999 (JP) .................................................. 11-138744

(51) Int. Cl.[7] ................................ F01L 1/34; F01L 13/00
(52) U.S. Cl. ................................ 123/90.15; 123/90.16; 123/90.17
(58) Field of Search ........................ 123/90.15, 90.16, 123/90.17, 90.18, 198 D

(56) References Cited

U.S. PATENT DOCUMENTS

| | | | | |
|---|---|---|---|---|
| 5,031,583 | * | 7/1991 | Konno | 123/90.16 |
| 5,669,341 | * | 9/1997 | Ushirono et al. | 123/90.11 |
| 5,803,029 | * | 9/1998 | Yoshihara et al. | 123/90.16 |
| 5,893,345 | * | 4/1999 | Sugimoto et al. | 123/90.17 |
| 6,131,541 | * | 10/2000 | Hasegawa et al. | 123/90.18 |
| 6,170,448 | * | 1/2001 | Asakura | 123/90.18 |

FOREIGN PATENT DOCUMENTS

| | | |
|---|---|---|
| 63-106310 | 5/1988 | (JP) . |
| 5-10161 | 1/1993 | (JP) . |
| 5-43847 | 7/1993 | (JP) . |

* cited by examiner

Primary Examiner—Weilun Lo
(74) Attorney, Agent, or Firm—Carrier, Blackman & Associates, P.C.; Joseph P. Carrier; William D. Blackman

(57) ABSTRACT

In a valve lift control system for engine intake valves which selectively changes an intake valve lift of an engine, and a phase angle relationship of a timing of opening the engine valve in relation with a crankshaft angle depending on the operating condition of the engine, an arrangement is made to limit the advancing of the opening timing of the engine valve when a large valve lift is selected. It is thus possible to limit the advancing of the timing of opening the engine intake valve only when the valve lift is increased, and the advancing of the timing of opening the engine intake valve may cause an interference between the engine intake valve and the corresponding engine piston. The valve opening timing is otherwise optimized, and the maximum performance of the engine can be attained under all possible circumstances.

7 Claims, 12 Drawing Sheets

INTAKE VALVE LIFT CONTROL SYSTEM

TECHNICAL FIELD

The present invention relates to a valve lift control system for the intake valves of internal combustion engines.

BACKGROUND OF THE INVENTION

Various proposals have been made to change the timing of opening the intake valve in relation with the top dead center of the piston movement depending on the rotational speed of the engine so that the output property of the engine may be improved over a wide rotational speed range.

For instance, according to the proposal made in Japanese patent laid open (kokaki) publication No. 63-106310, a plurality of cams for producing different timings and total lifts are provided on a common camshaft for each cylinder, and are actuated by individual rocker arms rotatably supported on a common rocker shaft. The adjacent ones of these rocker arms can be selectively connected to each other so that the valve timing and the total lift of the corresponding valve may be changed in a stepwise fashion. According to the proposal made in Japanese patent laid open (kokai) publication No. 5-10161, the phase relationship between the rotational angles of the camshaft and the crankshaft can be varied in a continuous manner. Japanese patent (kokoku) publication No. 5-43847 discloses a combination of these two technologies.

However, when the phase relationship of the camshaft in relationship with the crankshaft is changed in the arrangement where a plurality of cams are provided for each cylinder to the end of varying the opening timing and the total lift of the intake valve, it is possible that the piston at the top dead center may interfere with the intake valve if the timing and the lift of the intake valve are not properly selected. Such an interference is highly destructive, and should be avoided by all means. As shown in FIG. 12, when the cam lift is relatively small, even if the cam phase is advanced or the opening timing of the intake valve is advanced, the intake valve would not interfere with the piston at the top dead center. However, as shown in FIG. 13, when the cam lift is relatively large, if the cam phase is advanced or the opening timing of the intake valve is advanced as indicated by the solid line, the intake valve may interfere with the piston at the top dead center.

BRIEF SUMMARY OF THE INVENTION

In view of such problems of the prior art, a primary object of the present invention is to provide a valve lift control system for the intake valves of internal combustion engines which permits the valve timing to be advanced and the valve lift to be increased at the same time without risking the interference between the intake valve and the piston.

A second object of the present invention is to provide a valve lift control system which can maximize the engine performance by allowing the optimum selection of the valve timing and the valve lift.

A third object of the present invention is to provide a valve lift control system which is simple and economical to build.

A fourth object of the present invention is to provide a valve lift control system which is durable in use.

According to the present invention, such objects can be accomplished by providing a valve lift control system for engine intake valves, comprising: a first valve control unit for selectively changing a lift of an intake valve of an engine; a second valve control unit for selectively changing a phase angle relationship of a timing of opening the engine intake valve in relation with a crankshaft angle; and a central control unit for selectively activating the first and second valve control units according to an operating condition of the engine; the second valve control unit being provided with means for limiting an advancing of the opening timing of the engine intake valve when the first valve control unit has selected a large valve lift.

It is thus possible to limit the advancing of the timing of opening the engine intake valve only when a large valve lift is selected and the advancing of the valve timing may cause an interference between the engine valve and the piston. The valve lift is otherwise optimized, and the maximum performance of the engine can be attained under all possible circumstances. It is also conceivable to limit the valve lift when the valve timing is most advanced for the same effect. However, the valve timing is more suited for quick and fine adjustment than the valve lift.

This arrangement can be accomplished either electronically or mechanically. It is, however, preferable to provide both electronic and mechanical arrangements for limiting the valve lift for a maximum reliability of the system. According to an electronic arrangement, the limiting means comprises a computer provided with a programmed interlock routine for limiting the advancing of the opening timing of the engine valve when the first valve control unit has selected a large valve lift. According to a mechanical arrangement, the limiting means comprises a mechanical arrangement which mechanically prohibits the advancing of the opening timing of the engine intake valve when the first valve control unit has selected a large valve lift.

Because the activation of the limiting means occurs only when the first valve control unit is activated and the system is in the high speed mode, if the first and second valve control units are provided with hydraulic actuators for selectively changing the valve lift and the valve timing, respectively, the limiting means preferably comprises a solenoid valve which selectively conducts a hydraulic pressure from the first valve control unit to the second valve control unit for activation of the limiting means. This arrangement simplifies the hydraulic circuit.

According to a preferred embodiment, the second valve control unit comprises a proportional actuator which is capable of producing a substantially continuous displacement of a moveable member according to a duty ratio of electric current supplied to a solenoid valve for controlling a hydraulic pressure supplied to the proportional actuator, and the limiting means comprises a stopper pin which engages the moveable part within a prescribed limit of motion under the hydraulic pressure conducted from the first valve control unit. This is reliable in operation and simple in structure.

For a compact design of the second valve control unit, the proportional actuator preferably comprises a rotary actuator which is incorporated between a camshaft and a sprocket wheel for the actuation of the camshaft. Likewise, for compact and reliable design of the first valve control unit, the first valve control unit may comprise at least two cams provided for each cylinder, at least two rocker arms individually engaging the cams, and a hydraulically actuated pin in a guide hole passed jointly across the rocker arms, one of the rocker arms associated with one of the cams having a generally small cam lift being adapted to directly actuate the engine intake valve while the other of the rocker arms is not, whereby the engine intake valve is actuated according a cam lift of a selected one of the cams depending on a position of the pin.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
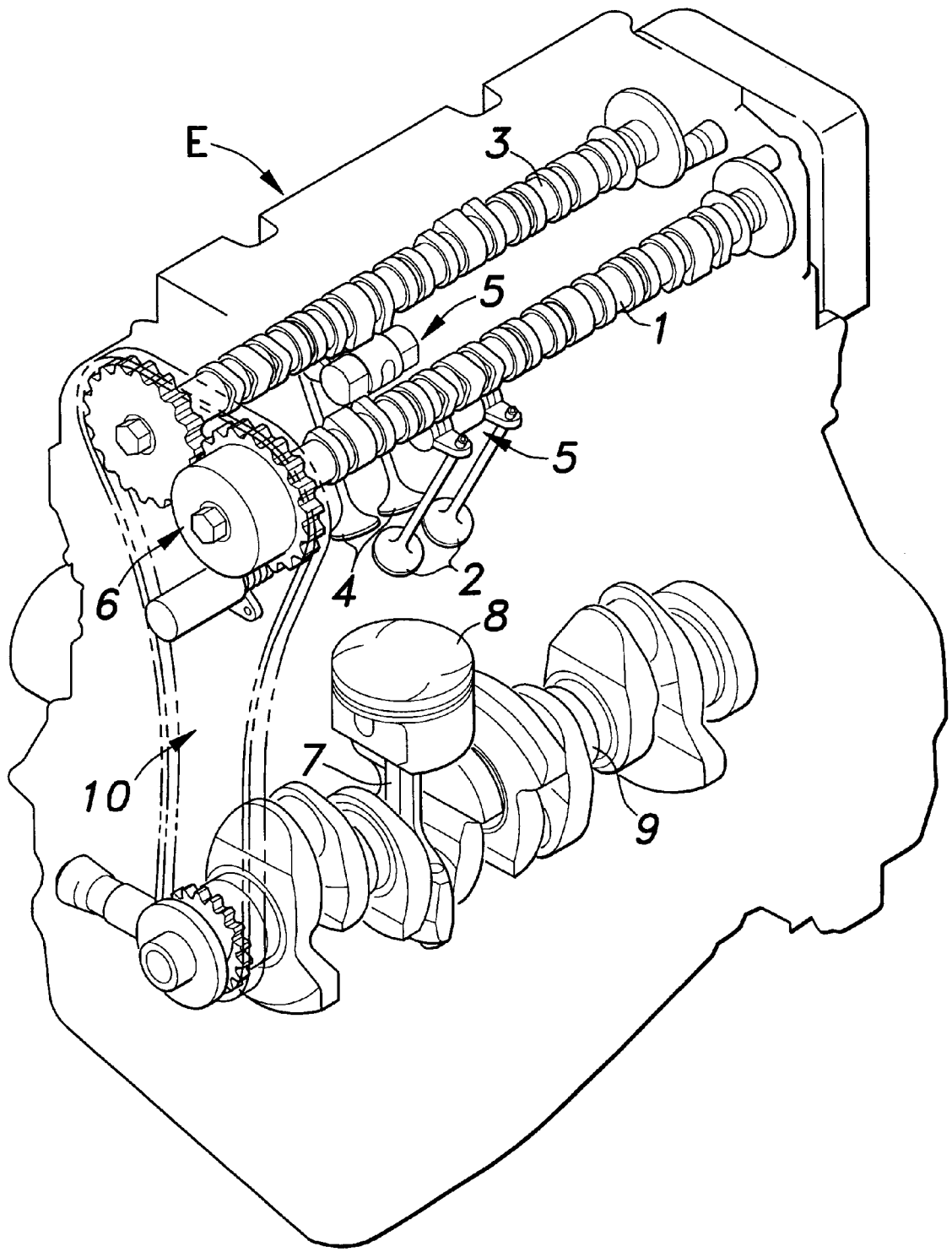
FIG. 1 is a see-through perspective view of an engine incorporated with an intake valve lift control system embodying the present invention.

FIG. 1 illustrates an in-line four cylinder DOHC engine incorporated with a valve lift control system embodying the present invention. The cylinder head of this engine E comprises, for each cylinder, a pair of intake valves 2 actuated by an intake camshaft 1 and a pair of exhaust valves 4 actuated by an exhaust camshaft 3. A first valve control unit 5 is provided between the two intake valves 2 for changing the valve lift and the valve open angular interval of the corresponding valves according to the rotational speed of the engine E. Another first valve control unit 5 is provided between the two exhaust valves 4 for likewise changing the valve lift and the valve open angular interval of the corresponding exhaust valves 4. A second valve control unit 6 is provided at an axial end of the intake camshaft 1 for changing the opening timing of the intake valves 2.

The engine E is provided with a crankshaft 9 which is connected to four pistons 8 via connecting rods 7. The intake camshaft 1 and the exhaust cam shaft 3 are connected to the crankshaft 9 via a chain/sprocket mechanism 10 so that the camshafts 1 and 3 rotate at a half the rotational speed of the crankshaft 9.

The first valve control unit 5 is described in the following with reference to FIGS. 2 and 3. The first valve control units 5 for the intake valves 2 and the exhaust valves 4 are identical to each other, and only the one for the intake valves 2 is described in the following.

Figure 2:
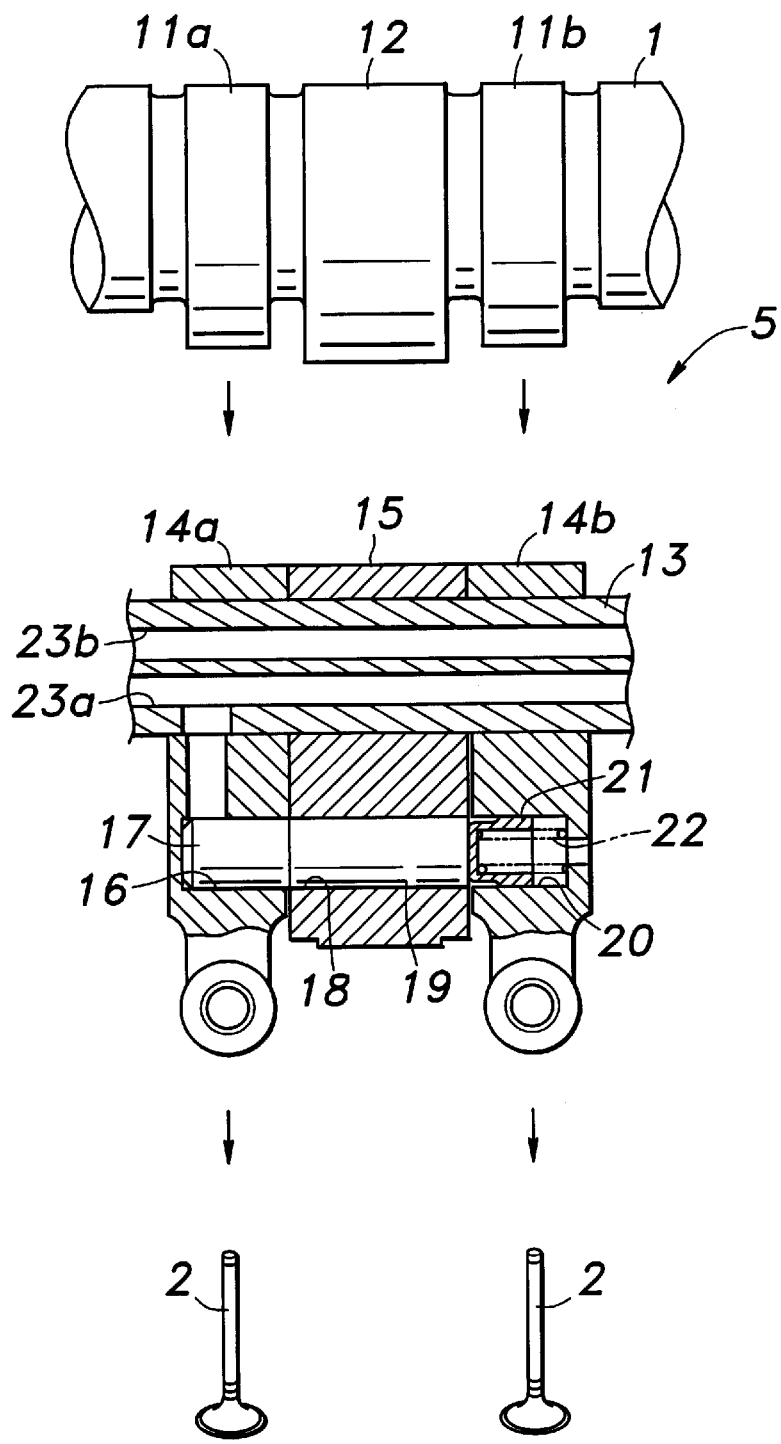
FIG. 2 is a diagrammatic view showing the valve cams, rocker arms and intake valves in the low speed mode.
Figure 3:
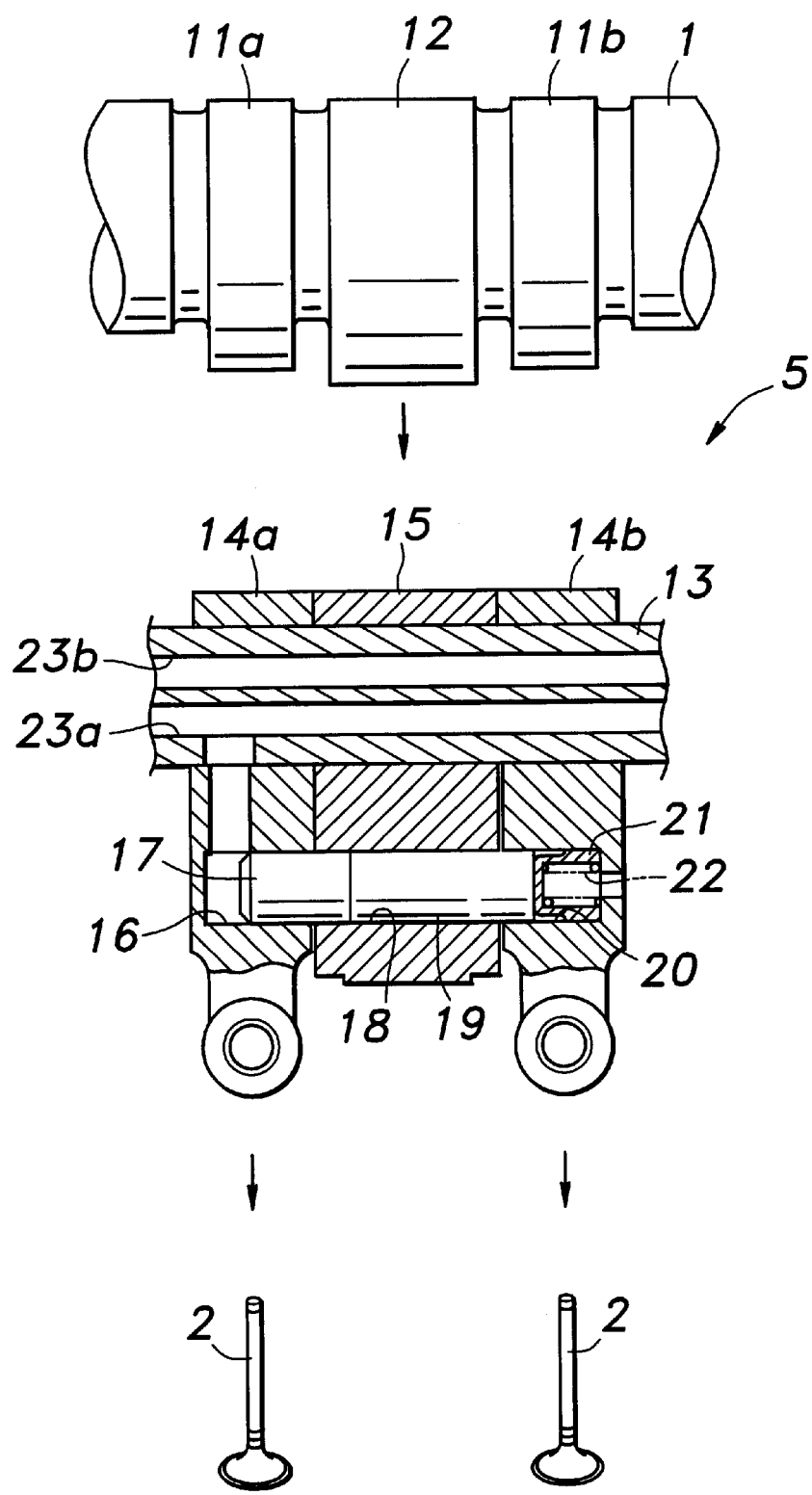
FIG. 3 is a diagrammatic view showing the valve cams, rocker arms and intake valves in the high speed mode.

Referring to FIG. 2, the intake camshaft 1 is integrally provided with a pair of low speed cams 11a and 11b for a relatively small open angular interval and lift, and a single high speed cam 12 for a relatively large open angular interval and lift located between the two low speed cams 11a and 11b. A rocker shaft 13 extends in parallel with and under the intake camshaft 1, and rotatably supports three rocker arms 14a, 15 and 14b which are disposed one next to the other and can individually undergo a rocking motion. These rocker arms 14a, 15 and 14b are adapted to be actuated by the corresponding cams 11a, 12 and 11b, respectively.

The low speed rocker arms 14a and 14b which are actuated by the low speed cams 11a and 11b are identically shaped, and each abut a stem end of the corresponding intake valve 2 which is normally urged in the closing direction by a compression coil spring not shown in the drawing. The high speed rocker arm 15 which is actuated by the high speed cam 12 is always kept engaged with the high speed cam 12 by a spring member not shown in the drawing. The three rocker arms 14a, 15 and 14b are internally provided with a selective coupling mechanism for selectively achieving a low speed mode in which the rocker arms are allowed to move individually and a high speed mode in which the rocker arms are coupled to each other for a joint movement.

Referring to FIG. 2, the low speed rocker arm 14a on the left is provided with a first guide hole 16 extending in parallel with the axial line of the rocker shaft 13 and opening out toward the high speed rocker arm 15, and a first selective coupling pin 17 is received in the first guide hole 16. The other end of the first guide hole 16 is closed. The high speed rocker arm 15 is provided with a second guide hole 18 which is passed through across the high speed rocker arm 15, and aligns with the first guide hole 16 when the high speed rocker arm 15 is at the rest position or when the cam slipper engages the base circle of the high speed cam 12. A second selective coupling pin 19 is received in the second guide hole 18, and has one end which abuts one end of the first selective coupling pin 17. The low speed rocker arm 14b on the right is provided with a third guide hole 20 which is similar to the first guide hole 16, but is communicated with the atmosphere via a relatively small opening at its end remote from the high speed rocker arm 15. A stopper pin 21 is received in the third guide hole 20, and has one end which abuts the other end of the second selective coupling pin 19. The stopper pin 21 is normally urged toward the high speed rocker arm 15 by a compression spring 22 placed between the other end of the stopper pin 21 and the bottom end of the third guide hole 20.

The rocker shaft 13 is internally provided with a pair of oil passages 23a and 23b for conducting lubricating oil drawn from an oil pan. One of the passages 23a communicates with the bottom end of the first guide hole 16, and the other passage 23b communicates with passages (not shown in the drawing) for supplying lubricating oil to the rocker arms 14a, 15 and 14b, and then to the contact surfaces of the corresponding cams 11a, 12 and 11b and the cam journals. The selective coupling mechanism includes an electromagnetic solenoid valve (not shown in the drawing) for controlling the oil pressure which is transmitted from the oil passage 23a to the first selective coupling pin 17 received in the first guide hole 16. The control signal is produced by an electronic control unit according to the operating condition of the engine.

In the low speed mode, no oil pressure is applied to the first selective coupling pin 17. Therefore, the three pins 17, 19 and 21 are all fully received in the corresponding guide holes 16, 18 and 20 under the spring force of the compression coil spring 22 (see FIG. 2) so that the rocker arms 14a, 15 and 14b are allowed to move independently from each other. In other words, the high speed rocker arm 15 which is actuated by the high speed rocker arm 12 would not affect the other rocker arms 14a and 14b, and the two intake valves 2 are simultaneously actuated by the low speed rocker arms 14a and 14b which are in turn actuated by the cam profiles of the low speed cams 11a and 11b.

In the high speed mode, oil pressure is applied to the first selective coupling pin 17. Therefore, as shown in FIG. 3, the second selective coupling pin 19 and the stopper pin 21 are pushed back against the spring force of the compression coil spring 22 so that the pins 17 and 19 sit across the corresponding pairs of the guide holes while the stopper pin 21 is pushed deep into the third guide hole 20. The three rocker arms 14a, 15 and 14b are thus held fast to each other, and the two intake valves 2 are simultaneously actuated by the cam profile of the central high speed cam 12 which is generally higher than the cam profiles of the low speed cams 11a and 11b.

Figure 4:
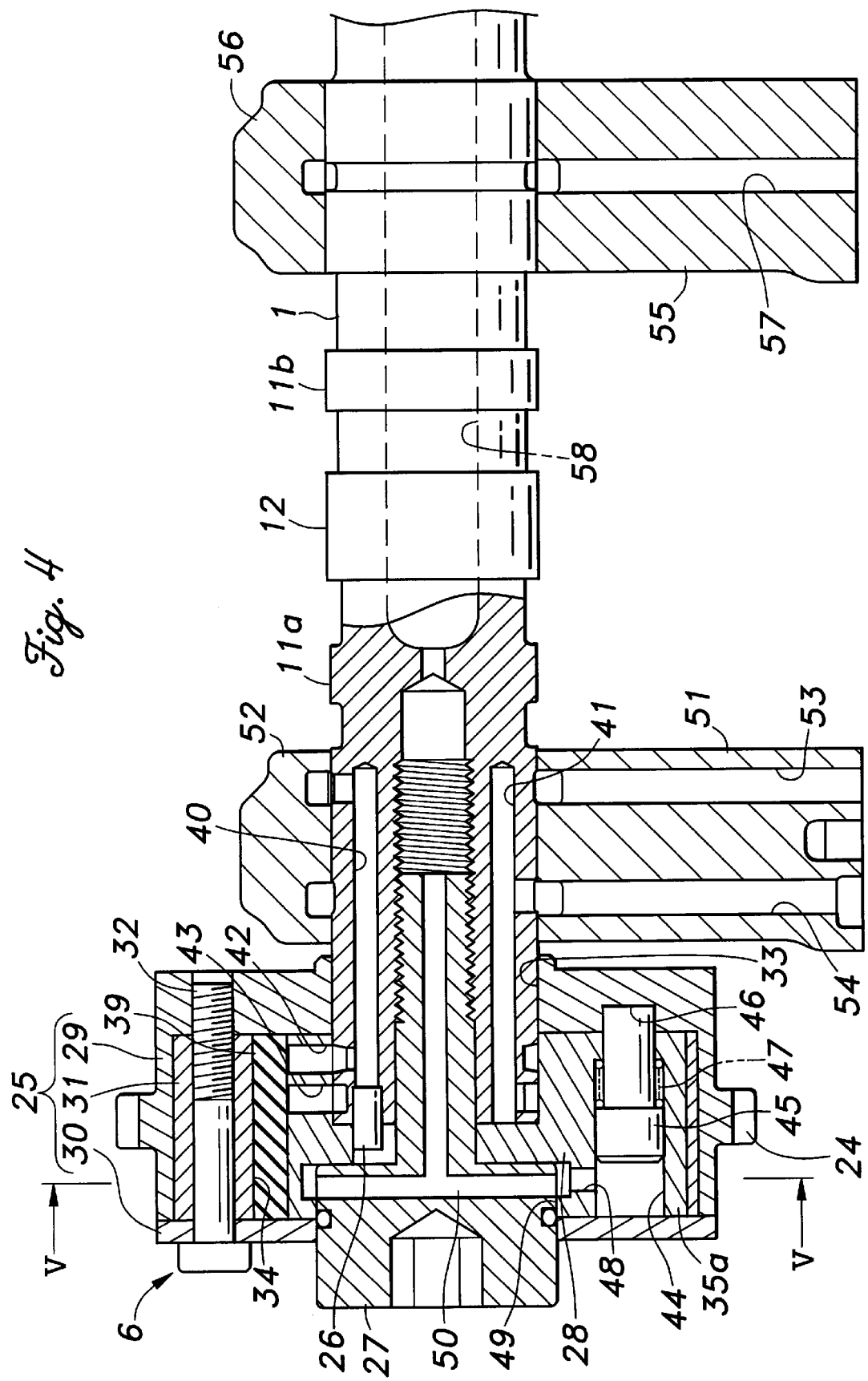
FIG. 4 is a sectional view of the second valve control unit.
Figure 5:
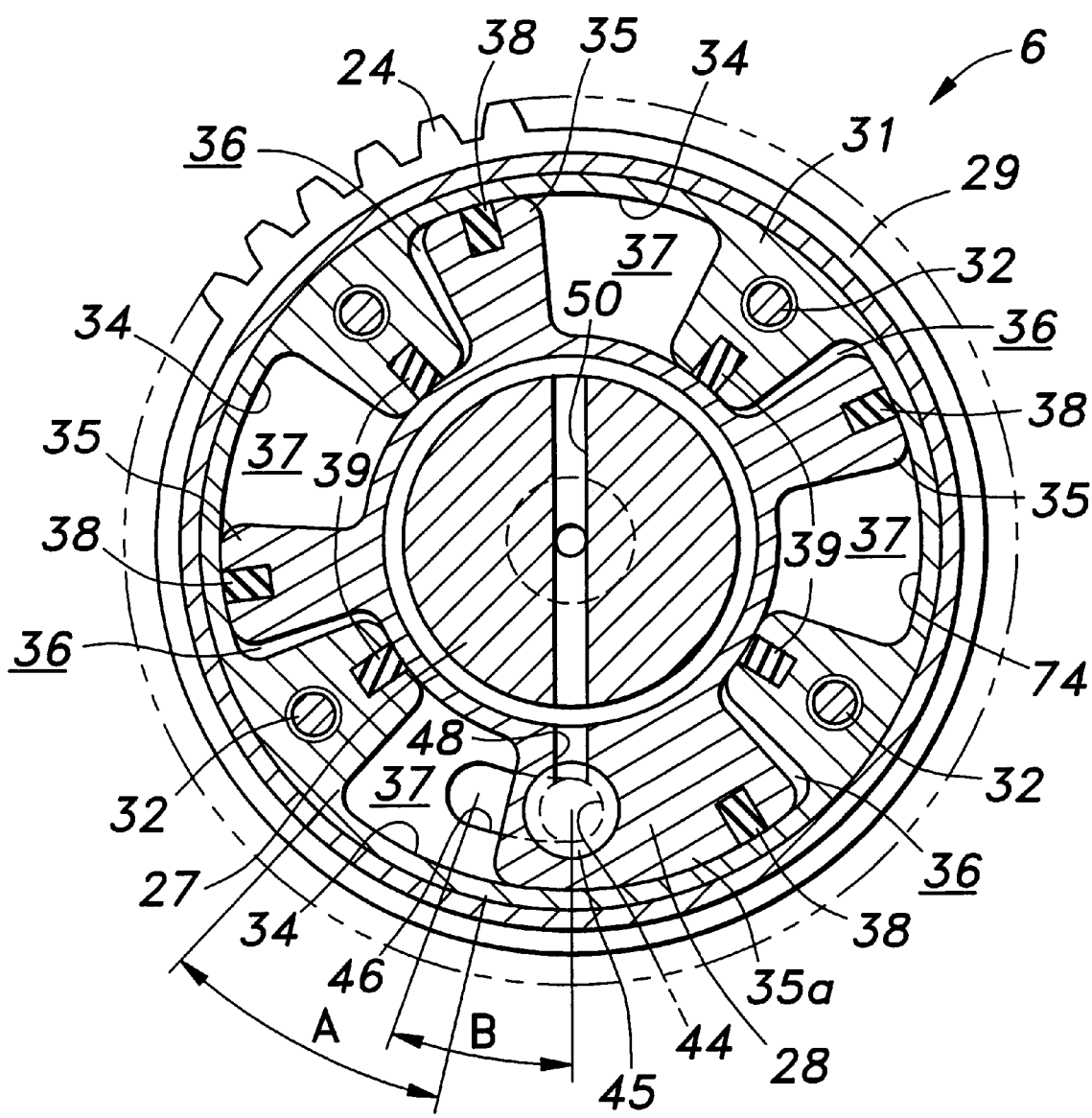
FIG. 5 is a sectional view taken along line V—V of FIG. 4.

The second valve control unit 6 which is provided at the axial end of the intake camshaft 1 is described in the following with reference to FIGS. 4 and 5. The second valve control unit 6 comprises an outer rotor 25 which is rotationally fast with a cam sprocket 24 around which the timing chain is passed, and an inner rotor 28 which is integrally attached to the intake cam shaft 1 by a pin 26 and a threaded bolt 27 having an enlarged head.

The outer rotor 25 comprises a generally cup-shaped cam sprocket portion 29 having sprocket teeth 24 formed on the outer circumference thereof, an outer plate 30 which is placed over the open end of the cup-shaped cam sprocket portion 29 or the outer axial end of the sprocket portion 29, and an annular casing 31 received inside the cup-shaped cam sprocket portion 29. These components of the outer rotor 25 are integrally joined to each other by a plurality of threaded bolts 32 passed axially through the outer rotor 25. An axial end of the intake camshaft 1 is received in a support hole 33 provided centrally in the bottom wall of the cam sprocket portion 29, and the inner rotor 28 which is integrally attached to the intake cam shaft 1 is rotatably received inside the casing 31.

The annular casing 31 is internally provided with four sector shaped recesses 34 which are defined by four inwardly directed vanes and arranged concentrically around the axial center of the intake camshaft 1. Four vanes 35 projecting radially from the outer circumferential surface of the inner rotor 28 are received in the corresponding recesses 34 so as to be moveable over a prescribed angle A (for instance 30 degrees). Thus, an advance angle chamber 36 is defined between one side of each vane 35 and the opposing wall of the corresponding recess 34, and a delay angle chamber 37 is defined between the other side of the vane 35 and the opposing wall of the corresponding recess 34. The radially outer end of each vane 35 is provided with a seal member 38 which engages the opposing inner circumferential surface of the corresponding recess 34. The inner circumferential surface of each inwardly directed vane of the casing 31 is provided with a seal member 39 which engages the outer circumferential surface of the inner rotor 28.

The intake camshaft 1 is internally provided with an advance angle oil passage 40 and a delay angle oil passage 41 at the axial end thereof. The advance angle oil passage 40 communicates with the four advance angle chambers 36 via four oil passages 42 radially passed through the inner rotor 28, and the delay angle oil passage 41 communicates with the four delay angle chambers 37 via four oil passages 43 radially passed through the inner rotor 28.

One of the vanes 35a of the inner rotor 28 is provided with an axially passed pin bore 44 which receives a stopper pin 45 having an enlarged head. The free end of the stopper pin 45 remote from the head thereof is adapted to be received in an arcuate slot 46 formed in the bottom wall of the cam sprocket portion 29, and is biased away from the arcuate slot 46 by a spring 47 interposed between a shoulder formed in the bottom wall of the inner rotor 28 and the enlarged head of the stopper pin 45. In other words, the stopper pin 45 is urged away from the arcuate slot 46 so as to be entirely received inside the vane 35a.

The angular range (as indicated by B in FIG. 5) of the arcuate slot 46 is defined in such a manner that the intake valves 2 would not interfere with the piston 8 at its top dead center when the intake valves 2 are opening by the high speed cam 12 for a high lift and the intake cam shaft 1 is advanced to an utmost degree (20 degrees, for instance).

The inner rotor 28 is provided with an oil passage 48 for applying the oil pressure which pushes down the stopper pin 45. This oil passage 48 communicates with the interior of the pin bore 44 from the inner circumferential surface of the hole 49 for receiving the enlarged head of the threaded bolt 27. An oil passage 50 extends from the center of the intake camshaft 1 axailly in the stem of this threaded bolt 27 and radially across the enlarged head of the threaded bolt 27.

The oil pressure for actuating the vanes 35 is supplied to the advance angle oil passage 40 and the delay angle oil passage 41 via oil passages 53 and 54 internally provided in a cam holder 51 and a bearing cap 52. The oil pressure for actuating the stopper pin 45 is supplied from an oil passage 57 internally provided in another cam holder 55 and a corresponding bearing cap 56, and an oil passage 58 provided centrally in the intake camshaft 1.

Figure 6:
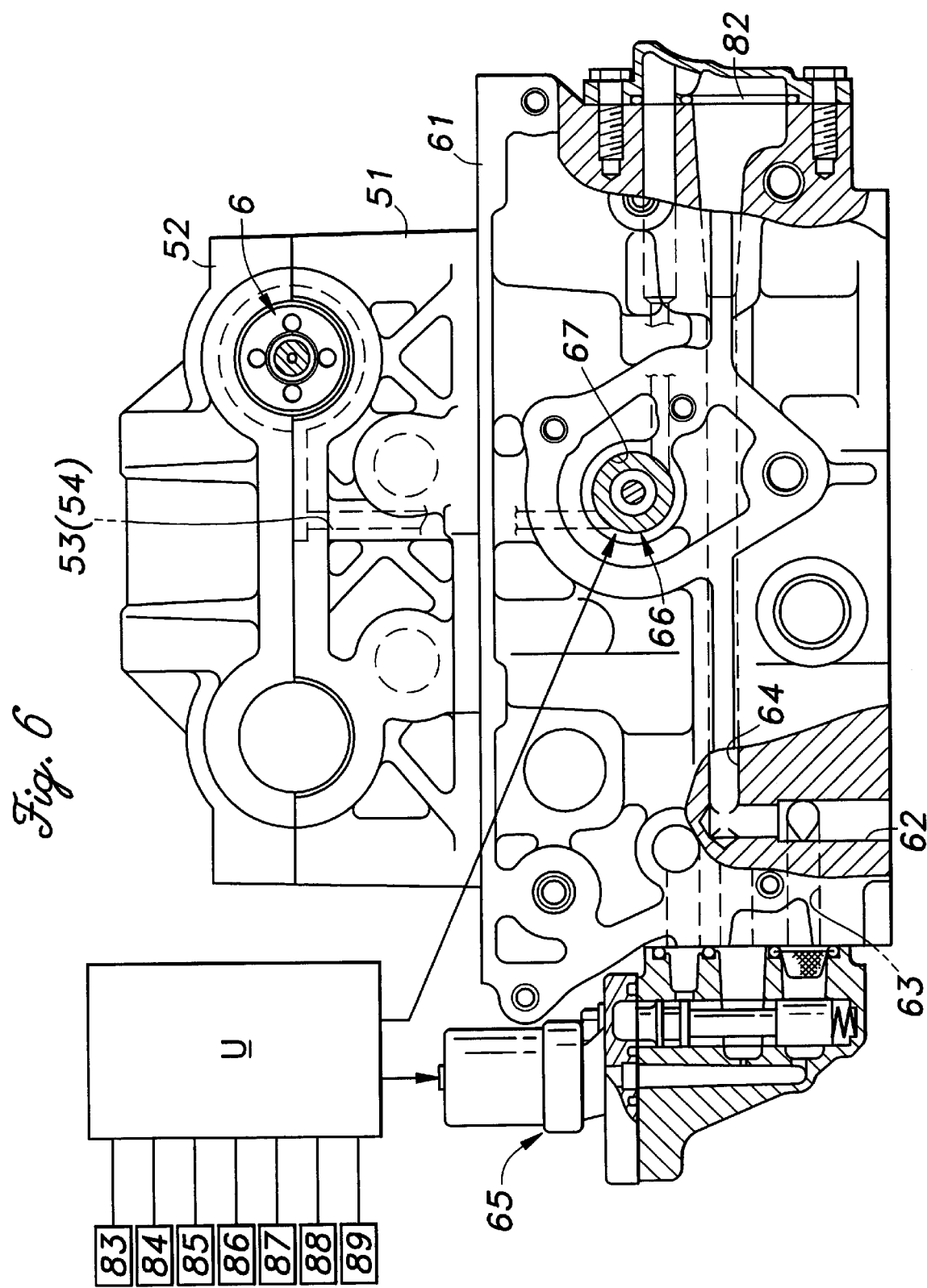
FIG. 6 is a partly broken away front view of the cylinder head.

The oil pressure circuit for the first and second valve control units 5 and 6 is described in the following with reference to FIG. 6.

The oil drawn from the oil pan by an oil pump is supplied to an upstream portion 62 of an oil passage internally provided in the cylinder head 61 as a lubricating oil for the valve actuating mechanism, and as an actuating oil for the first and second valve control units 5 and 6. The upstream portion 62 branches into an oil passage 63 for supplying oil pressure to the first valve control units 5, and an oil passage 64 for supplying oil pressure to the second valve control unit 6. These oil passages for supplying oil pressure are formed either by casting or drilling in the wall of the cylinder head 61, similarly as the oil passages for lubricating camshafts and the rocker shafts.

In an intermediate part of the passage 63 for supplying oil pressure to the first valve control units 5 is provided a first oil pressure control valve 65 for selectively supplying oil pressure to the oil supply passage 23b in the rocker shaft 13 according to the operating condition of the engine. In an intermediate portion of the oil passage 64 for supplying oil pressure to the second valve control unit 6 is provided a second oil pressure control valve 66 for continually controlling the direction and rate of the oil flow.

Figure 7:
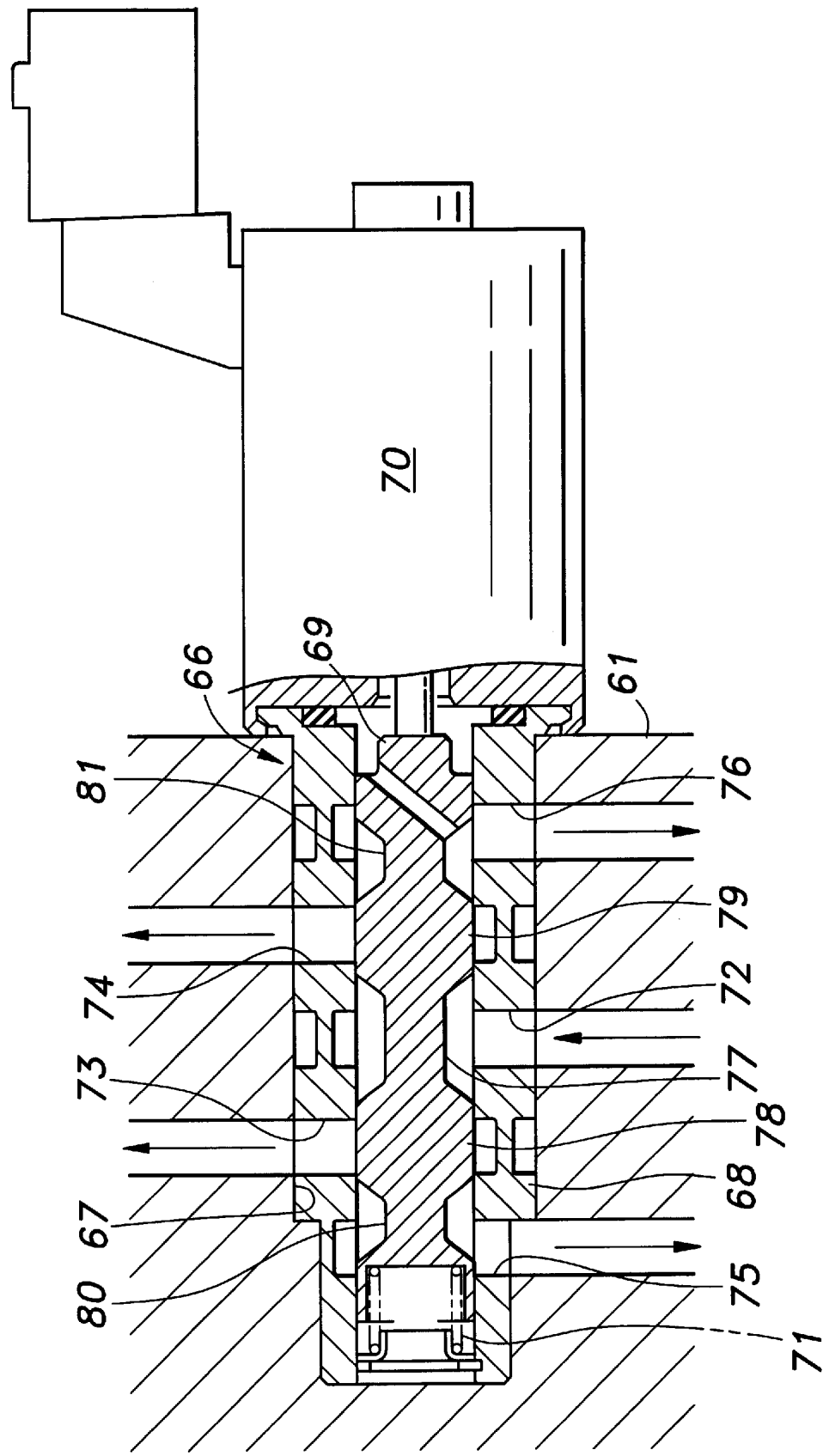
FIG. 7 is a sectional view of the second oil pressure control valve.

Referring to FIG. 7, the second oil pressure control valve 66 comprises a cylindrical sleeve 68 fitted into a cylindrical bore 67 formed in the cylinder head 61, a duty ratio solenoid 70 fixedly attached to the sleeve 68 for actuating a valve spool 69, and a spring 71 for resiliently urging the valve spool 69 toward the duty ratio solenoid 70.

The sleeve 68 is provided with a central input port 72, an advance angle port 73 and a delay angle port 74 formed on either side of the input port 72, and a pair of drain ports 75 and 76 provided on either side of the advance angle port 73 and the delay angle port 74. The valve spool 69 received in the sleeve 68 is provided with an annular central groove 77, a pair of annular lands 78 and 79 on either side of the central groove 77, and a pair of grooves 80 and 81 on either side of these lands 78 and 79. The input port 72 is connected to the upstream portion 62 of the oil passage via an oil filter 82, and the advance angle port 73 is connected to the advance angle chambers 46 of the second valve control unit 6 while the delay angle port 74 is connected to the delay angle chambers 37 of the second valve control unit 6.

The first and second oil pressure control valves 65 and 66 are individually controlled by an electronic control unit U which receives a phase signal representing the phase angle of the intake camshaft 1 from a cam phase sensor 83, a top dead center signal from a top dead center sensor 84 based on the phase angle of the exhaust camshaft 3, a crankshaft phase signal from a crank phase sensor 85, an intake negative pressure signal from an intake negative pressure sensor 86, a cooling water temperature from a cooling water temperature sensor 87, a throttle opening angle signal from a throttle opening angle sensor 88, and an engine rotational speed signal from an engine rotational speed sensor 89.

Figure 8:
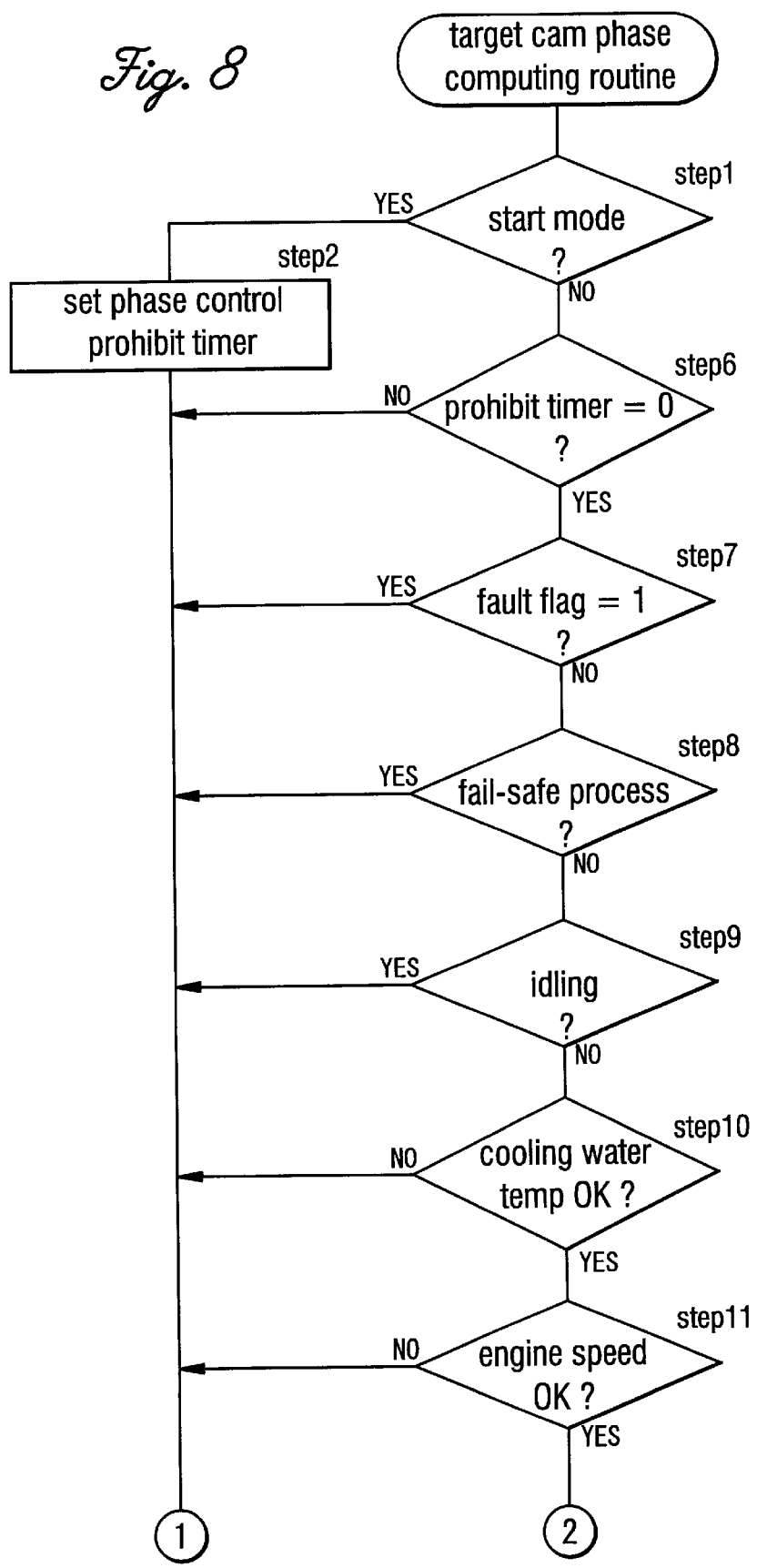
FIG. 8 is a first part of a flow chart of the routine for computing the target cam phase.
Figure 9:
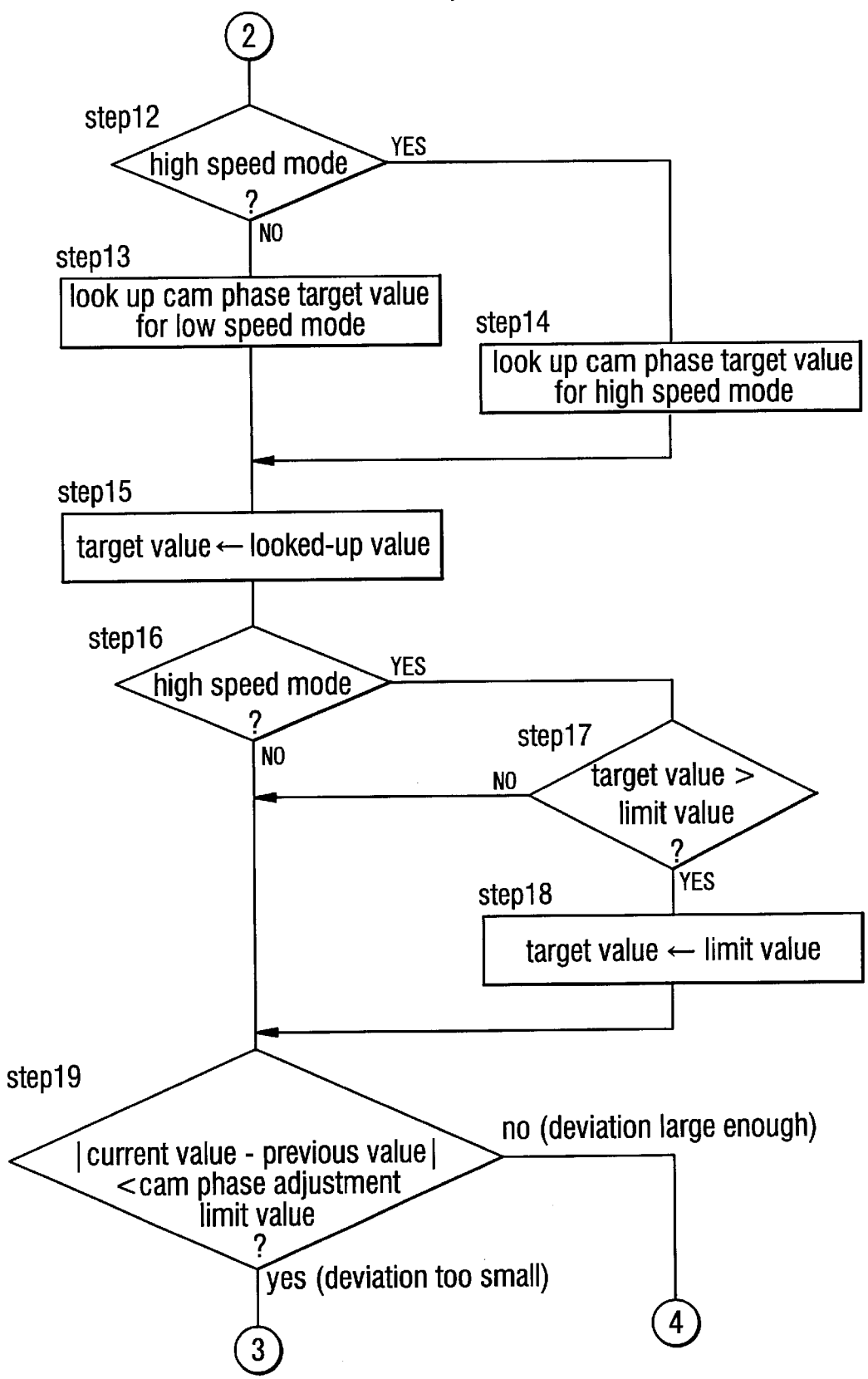
FIGS. 9 and 10 are second and third parts of the flow chart.
Figure 10:
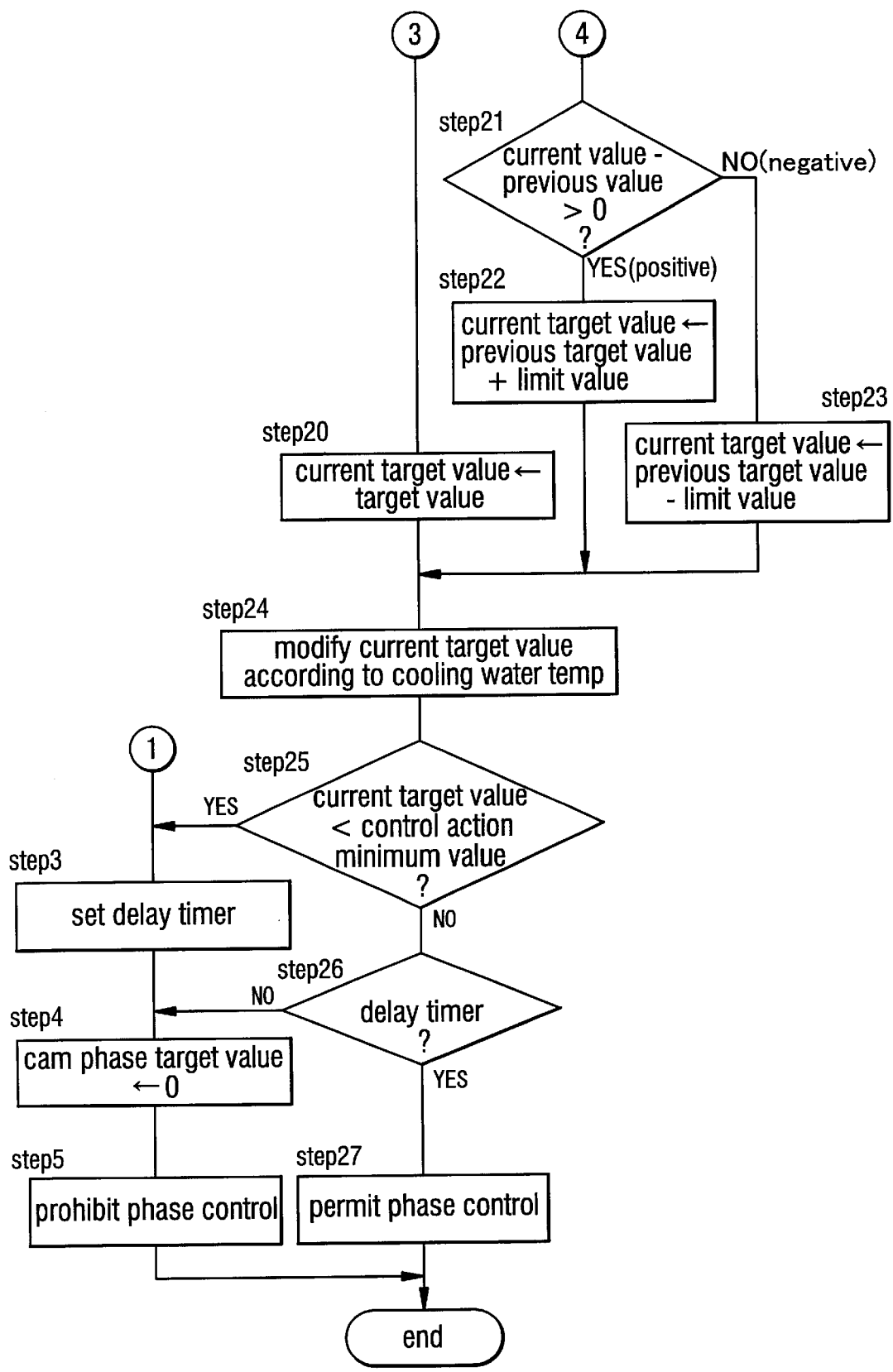

The computing routine for computing a target cam phase for the second valve control unit 6 is described in the following with reference to FIGS. 8 to 10.

First of all, it is determined if the engine E is in a start mode (step 1). If the engine is in the start mode, a cam phase control interlock timer (five seconds, for instance) is set (step 2) so as to prohibit a cam phase control until the time on this timer runs out. Then, a delay timer for delaying the activation of the second valve control unit 6 (0.5 seconds, for instance) is set (step 3), and a cam phase target value is set to zero (step 4), and a cam phase control enable flag is set to "0" (disable) (step 5).

If it is determined in step 1 that the engine E has been running, and a normal mode has set in, in place of the start mode, and the cam phase control interlock timer has timed up in step 6, it is determined if the second valve control unit 6 is faulty or not (step 7). If the second valve control unit 6 is found to be properly operating in step 7, it is determined if there is any other fault in the system (step 8). If no such fault is found in step 8, it is determined if the engine is idling or not (step 9). If the engine is not idling in step 9, it is then determined if the cooling water temperature is within a prescribed range (from 0° C. to 110° C., for instance) or not (step 10). If the cooling water temperature is found to be within the prescribed range, it is determined if the engine rotational speed is below a prescribed threshold level (1,500 rpm) or not (step 11). If the engine rotational speed is found to be above this threshold level, the program flow advances to step 12 to activated the second valve control unit 6.

If the cam phase control interlock timer has not timed up in step 6, if a fault of the second valve control unit 6 is detected in step 7, if any other fault is detected in step 8, if the engine E is found to be idling in step 9, the cooling water temperature is found to be outside the prescribed range in step 10, or if the rotational speed of the engine is found to be below the threshold level in step 11, the program flow advances to steps 3 to 5, and the activation of the second valve control unit 6 is prohibited.

In step 12, it is determined if the first valve control units 5 are in a high speed mode or a low speed mode. If the first valve control units 5 are found to be in the low speed mode, a cam phase target value is looked up from a map corresponding to the low speed mode (step 13). Conversely, if the first valve control units 5 are found to be in the high speed mode, a cam phase target value is looked up from a map corresponding to the high speed mode (step 14). The value looked up from the map is selected as a current cam phase target value (step 15).

Then, it is determined again if the first valve control units 5 are in the high speed mode or the low speed mode (step 16). If the high speed mode is detected, it is determined if the current cam phase target value looked up in step 15 is greater than a certain limit value (20 degrees in terms of the rotational angle of the intake camshaft 1, for instance) or not (step 17). If the current cam phase target value is found to be greater than the limit value, the current cam phase target value is replaced by the limit value (step 18). This process electrically prevents an excessive angle advance of the intake camshaft in the high speed mode involving a relatively large valve lift, and thereby prevents the intake valves 2 from interfering with the piston 8.

Then, if the low speed mode is detected in step 16, if the target value is found to be below the limit value in step 17 or if the target value is reduced to the limit value in step 18, the previous cam phase target value is subtracted from the current cam phase target value, and the absolute value of this difference is compared with a prescribed cam phase adjustment limit value (two degrees in terms of the crankshaft angle, for instance) (step 19). If the relationship "|current value−previous value|<limit value" holds, or, in other words, the absolute value of the difference is relatively small, the current cam phase target value is replaced by the target value obtained in step 15 or step 18 (step 20).

Conversely, when the absolute value of the difference is relatively large, the sign of the difference is determined in step 21. If the relationship "difference>0" holds, or if the difference is positive in step 21, the current cam phase target value is given as a sum of the previous cam phase target value and the cam phase adjustment limit value so as to advance the cam phase in a stepwise fashion (step 22). If the relationship "difference>0" does not hold, or if the difference is negative in step 21, the current cam phase target value is given as the previous cam phase target value minus the cam phase adjustment limit value so as to delay the cam phase in a stepwise fashion (step 23).

When the difference between the current cam phase target value and the previous cam phase target value has exceeded the cam phase adjustment limit value in steps 19 to 23, the cam phase target value is not allowed to be increased or decreased by any more than the cam phase adjustment limit value so as to avoid an overshoot in the feedback control due to a rapid change in the cam phase. Also, this prevents an unnecessary change in the cam phase from being effected, for instance, when the rotational speed of the engine is sharply increased and quickly reduced to the original level, such as the case in a transmission gear shift.

Figure 11:
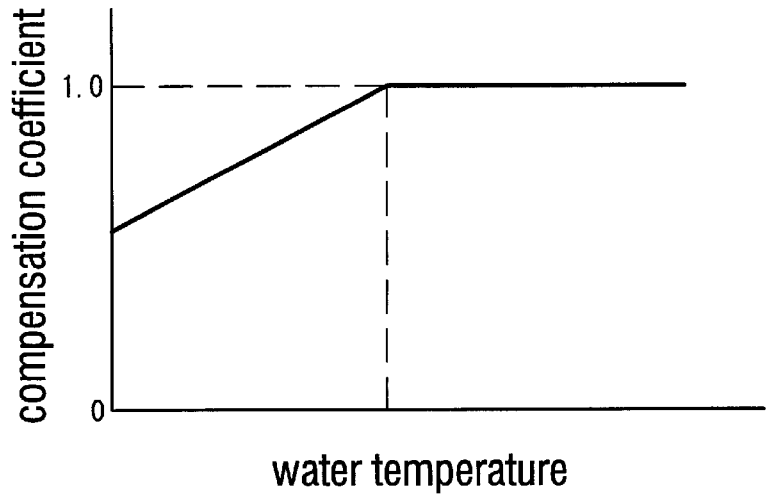
FIG. 11 is a graph representing the map for looking up the water temperature compensation coefficient from the cooling water temperature.
Figure 12:
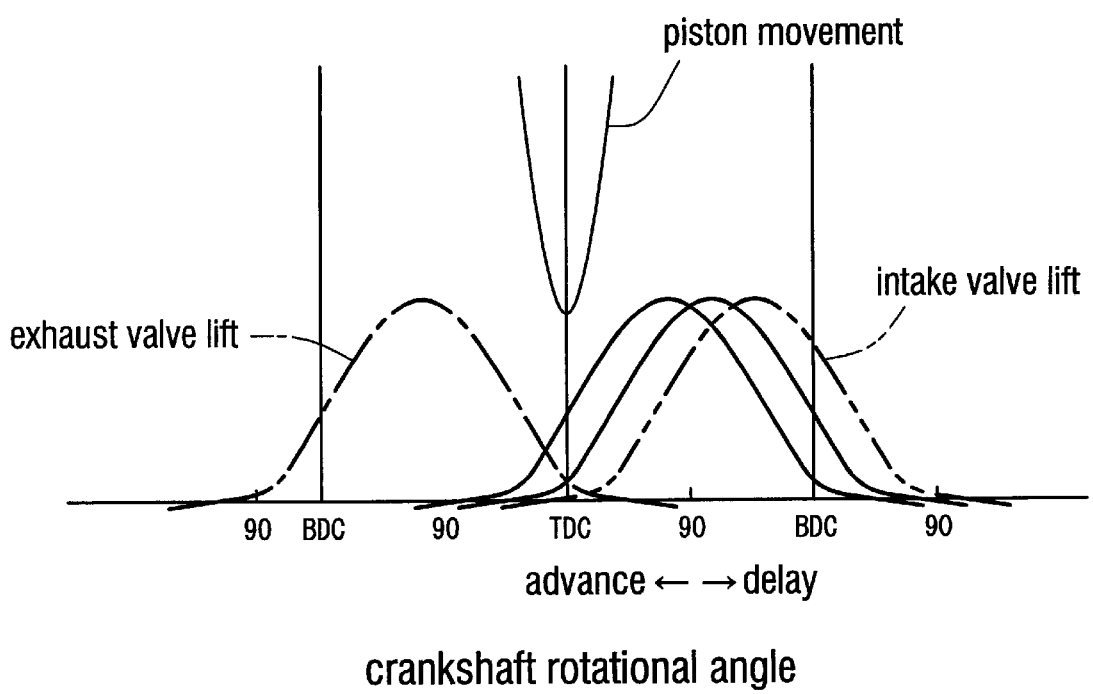
FIG. 12 is a graph showing the movements of the piston and the intake valves in relation to the crankshaft rotational angle in the low speed mode.

Thereafter, the cam phase target value is adjusted by multiplying a cooling water temperature compensation coefficient (step 24). The cooling water temperature compensation coefficient may be selected so as to be "1" when the water temperature is above a prescribed level, and to decrease linearly with the drop in the water temperature as shown in FIG. 11.

When the current cam phase target value is not much greater than the default value or the most delayed value (three to five degrees in terms of the crankshaft angle, for instance), as the corresponding control action would not produce any significant change in the engine performance, and may only reduce the stability of the control process, it would be desirable to dispense with the camshaft phase control under such a circumstance. Based on this logic, the magnitude of the current cam phase target value relative to that for the most delayed phase condition is compared with a minimum value for conducting a control action (step 25). If the current cam phase target value is less than the minimum value for conducting a control action (as is typically the case when the engine is under a low load condition immediately after the conclusion of an idling state), no control action should be taken as discussed above, and the program flow advances to steps 3 to 5, thereby prohibiting the activation of the second valve control unit 6.

Conversely, if the current cam phase target value is greater than the minimum value for conducting a control action in step 25, after waiting a second valve control delay timer to time up in step 26, the valve control enable flag is set to "1" in step 27 to enable the activation of the second valve control unit 6. The second valve control delay timer is provided for the purpose of avoiding a hunting of the control action when the selection between the start mode and the normal mode is made in step 26.

By controlling the duty ratio of the current supplied to the duty ratio solenoid 70 of the second oil pressure control valve 66 according to the cam phase target value determined as described above, the axial position of the valve spool 69 received in the sleeve 68 can be controlled in a continuous manner. The mode of operation of the second valve control unit 6 is described in the following.

When the engine E is started, and the oil pump is turned, oil pressure is transmitted to the advance angle chamber 36 via the second oil pressure control valve 66. As the duty ratio of the electric current supplied to the duty ratio solenoid 70 is appropriately increased from this state, the valve spool 69 moves leftward beyond the neutral position against the spring force of the spring 71 as shown in FIG. 7 so that the input port 72 leading to the oil pump is communicated with the advance angle port 73 via the central groove 77 and the delay angle port 74 is communicated with the drain port 76 via the right groove 81. As a result, oil pressure is introduced into the advance angle chambers 36 of the second valve control unit 6, and the resulting oil pressure difference produced between the advance angle chambers 36 and the delay angle chambers 37 pushes the vanes 35 in such a direction that the intake camshaft 1 turns in clockwise direction relative to the cam sprocket portion 29, and the low speed cams 11a and 11b and the high speed cam 12 jointly advance in phase. As a result, the opening and closing timings of the intake valves 2 both advance in angle.

Once the target cam phase is achieved, the duty ratio of the electric current supplied to the duty ratio solenoid 70 is fixed at 50% so that the valve spool 69 of the second oil pressure control valve 66 is kept stationary at the neutral position as shown in FIG. 7. Thus, the input port 72 is closed between the two lands 78 and 79, and the advance angle port 73 and the delay angle port 74 are closed by the lands 78 and 79, respectively. As a result, the cam sprocket portion 29 and the intake cam shaft 1 are integrally joined to each other, and the cam phase is kept at a fixed value.

The cam phase of the intake cam shaft 1 can be continuously delayed by appropriately reducing the duty ratio from the 50% value, and moving the valve spool rightward from the neutral position so that the input port 72 leading to the oil pump is communicated with the delay angle port 74 via the central groove 77, and the advance angle port 73 is communicated with the drain port 75 via the left groove 80. Once the target phase is achieved, the duty ratio of the electric current supplied to the duty ratio solenoid 70 is fixed at 50% so that the valve spool 69 of the second oil pressure control valve 66 is kept stationary at the neutral position as shown in FIG. 7.

If the first valve control unit 5 is activated in the high speed mode, the oil pressure supplied to the first valve control unit 5 is also supplied to the stopper pin 45 of the second valve control unit 6. Thus, the free end of the stopper pin 45 is pushed into the arcuate slot 46, and the movement of the vanes is limited to the 20 degree range in terms of the rotational angle of the intake camshaft 1.

Figure 13:
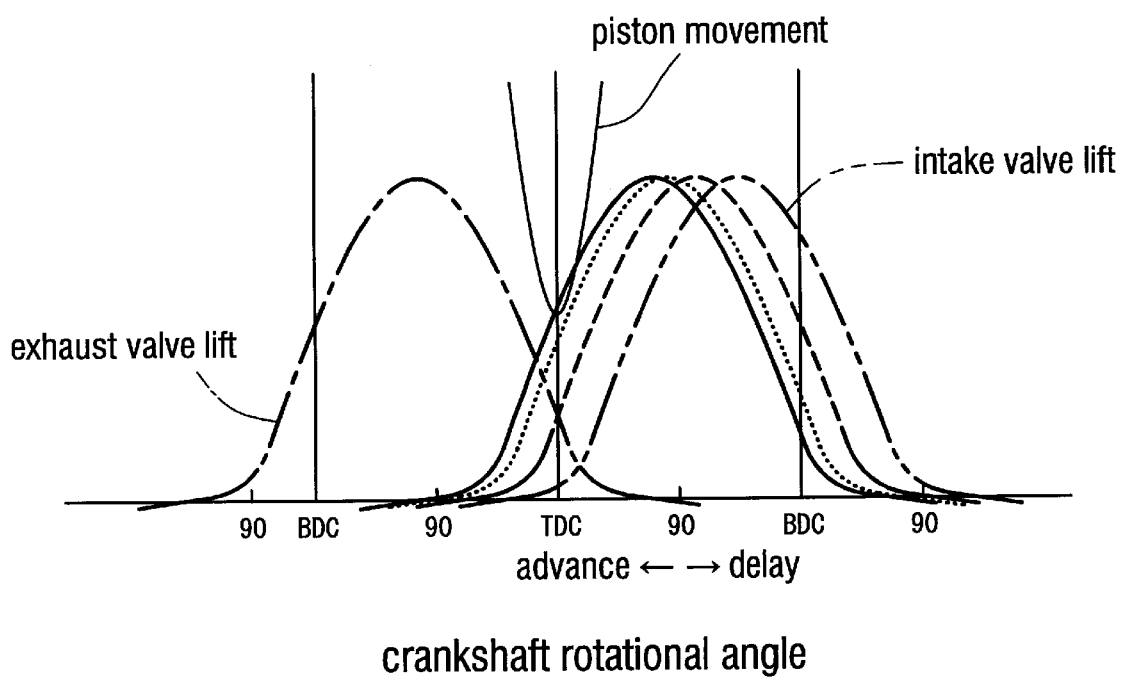
FIG. 13 is a graph showing the movements of the piston and the intake valves in relation to the crankshaft rotational angle in the high speed mode.

The second valve control unit 6 thus changes the phase relationship between the crankshaft 9 and the intake camshaft 1 over different ranges depending on the operating mode. In the low speed mode, the opening timing of the intake valves is allowed to advance and lag in a continuous manner over the entire 30 degree range of the intake camshaft 1 (which corresponds to the 60 degree range of the crankshaft 9). In the high speed mode, the opening timing of the intake valves is allowed to advance and lag in a continuous manner only over the 20 degree range of the intake camshaft 1 (which corresponds to the 40 degree range of the crankshaft 9) as indicated by the dotted line in FIG. 13.

The mechanism for limiting the rotational angle of the intake camshaft is not limited to the axially moveable stopper pin 45 described above. For instance, a radially moveable stopper pin may be received in one of the vanes 35a so that the free end thereof may be selectively fitted into a hole provided in the inner circumferential surface of the recess 34. In this case, the pin may be adapted to be actuated by a centrifugal force, instead of oil pressure, so that the range of angle advance may be limited when the rotational speed of the intake camshaft 1 has exceeded a certain prescribed level.

Thus, according to the present invention, the range of advance angle is more limited in the high speed mode than in the low speed mode so that the interference of the intake valves with the piston at the top dead center can be effectively prevented. In other words, the intake valves are allowed to be lifted as much as possible without interfering with the piston.

Although the present invention has been described in terms of a preferred embodiment thereof, it is obvious to a person skilled in the art that various alterations and modifications are possible without departing from the scope of the present invention which is set forth in the appended claims.

What is claimed is:

1. A valve lift control system for engine intake valves, comprising:
    a first valve control unit for selectively changing a lift of an intake valve of an engine;
    a second valve control unit for selectively changing a phase angle relationship of a timing of opening said engine intake valve in relation with a crankshaft angle; and
    a central control unit for selectively activating said first and second valve control units according to an operating condition of the engine;
    said second valve control unit being provided with means for limiting an advancing of the opening timing of said engine intake valve when said first valve control unit has selected a large valve lift.

2. A valve lift control system for engine valves according to claim 1, wherein said limiting means comprises a computer provided with a programmed interlock routine for limiting an advancing of the opening timing of said engine intake valve when said first valve control unit has selected said large valve lift.

3. A valve lift control system for engine valves according to claim 1, wherein said limiting means comprises a mechanical arrangement which mechanically prohibits the advancing of the opening timing of said engine intake valve when said first valve control unit has selected said large valve lift.

4. A valve lift control system for engine valves according to claim 3, wherein said first and second valve control units are provided with hydraulic actuators for selectively changing the valve lift and the valve timing, respectively, and said limiting means comprises a solenoid valve which selectively conducts a hydraulic pressure from said first valve control unit to said second valve control unit for activation of said limiting means.

5. A valve lift control system for engine valves according to claim 4, wherein said second valve control unit comprises a proportional actuator which is capable of producing a substantially continuous displacement of a moveable member according to a duty ratio of electric current supplied to a solenoid valve for controlling a hydraulic pressure supplied to said proportional actuator, and said limiting means comprises a stopper pin which engages said moveable member within a prescribed limit of motion under said hydraulic pressure conducted from said first valve control unit.

6. A valve lift control system for engine valves according to claim 5, wherein said proportional actuator comprises a rotary actuator which is incorporated between a camshaft and a sprocket wheel.

7. A valve lift control system for engine valves according to claim 5, wherein said first valve control unit comprises at least two cams provided for each cylinder, at least two rocker arms individually engaging said cams, and a hydraulically actuated pin in a guide hole passed jointly across said rocker arms, one of said rocker arms associated with one of said cams having a generally small cam lift being adapted to directly actuate said engine intake valve while the other of said rocker arms is not, whereby said engine intake valve is actuated according a cam lift of a selected one of said cams depending on a position of said pin.

* * * * *

UNITED STATES PATENT AND TRADEMARK OFFICE
CERTIFICATE OF CORRECTION

PATENT NO.   : 6,230,675 B1
DATED        : May 15, 2001
INVENTOR(S)  : Kobayashi et al.

It is certified that error appears in the above-identified patent and that said Letters Patent is hereby corrected as shown below:

<u>Column 2,</u>
Line 65, after "according" insert -- to --.

<u>Column 7,</u>
Line 51, change "activated" to -- activate --.

<u>Column 9,</u>
Line 42, before "clockwise" insert -- the --.

<u>Column 10,</u>
Line 23, change "camshaft is" to -- camshaft 1 is --.

<u>Column 12,</u>
Line 18, after "according" insert -- to --.

Signed and Sealed this

Ninth Day of July, 2002

*Attest:*

JAMES E. ROGAN
*Attesting Officer*      *Director of the United States Patent and Trademark Office*